G. H. Reister,
Harvester Rake.
No. 94,440. Patented Aug. 31, 1869.
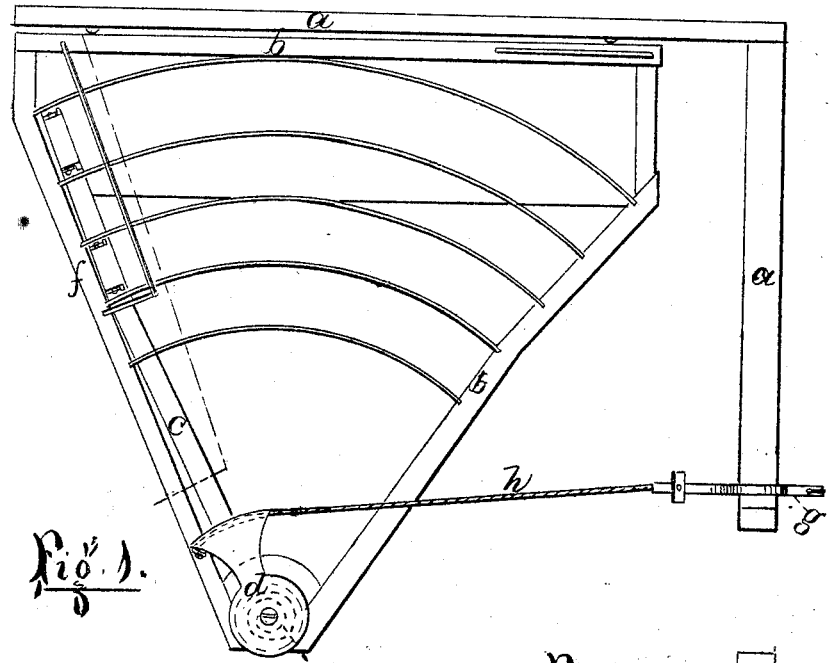
Fig. 1.
Fig. 3.
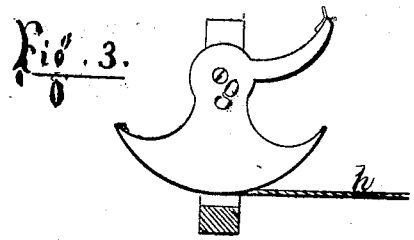
Fig. 2.
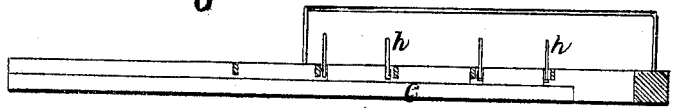
Fig. 4.
Witnesses.
T. Smith
L. E. Jones.
Inventor,
Geo. H. Reister
by Atty Thos. T. Everett

UNITED STATES PATENT OFFICE.

GEORGE H. REISTER, OF WASHINGTON, IOWA.

IMPROVED RAKE FOR HARVESTERS.

Specification forming part of Letters Patent No. 94,440, dated August 31, 1869.

*To all whom it may concern:*

Be it known that I, GEORGE H. REISTER, of Washington, in the State of Iowa, have invented a certain new and useful Improvement on Rakes for Harvesters; and I do hereby declare that the following is a full, clear, and exact description of the construction and operation of the same, reference being had to the accompanying drawings, and to the letters and marks thereon, which said drawings form part of this specification and show my invention—

Figure 1 thereof being a top view of the rake and its frame; Fig. 2, a view of the rake-bar and part of its frame; Fig. 3, a view of a foot-lever for operating the rake in one direction, and Fig. 4 a view of one of the teeth of the rake.

The object of my improvement is to provide the reaper with a cheap and simple raking attachment, not liable to get out of order, and adapted to different degrees of weight and bulk of grain and stalk.

To the reaper-frame $a$ I attach the frame $b$ of the raker.

As is shown by Fig. 1, the one end of the raker-bar $c$ is affixed to the cap $d$, within which is a helical or watch spring, $e$. This helical spring is so attached that its tendency is to force the raker-bar toward the side bar $f$ of the frame. In this position it will rest unless acted upon by the foot-lever $g$ through the cord $h$. Whenever the driver wishes to have the raker act to remove or deliver the grain lying on the platform, he has simply to put his foot upon the lever $g$, sweeping the rake across the platform and removing the cut grain therefrom, and, as he releases his foot from the lever, the spring will come into play and carry the rake back to its first-named position against the side bar $f$.

The teeth $h$ of the rake, as shown by Fig. 4, are pivoted to the bar, so that when carrying the cut grain along they will be vertical, as shown by this figure, but when traveling back will be nearly or quite horizontal. The teeth have a pivoting-pin, $i$, and a stay-pin, $j$, to enable them to hold the two positions here named.

What I claim as my invention, and desire to secure by Letters Patent, is—

The combination and arrangement of the raker-bar $c$, spring $e$, cord $h$, and lever $g$, as and for the purposes herein recited.

This specification signed this 10th day of February, 1869.

GEO. H. REISTER.

Witnesses:
M. M. SHEERER,
I. A. DICKSON.